(12) United States Patent
Yerushalmi-Rozen

(10) Patent No.: US 7,812,083 B2
(45) Date of Patent: Oct. 12, 2010

(54) METHOD FOR THE PREPARATION OF DISPERSIONS OF CARBON NANOTUBES

(75) Inventor: Rachel Yerushalmi-Rozen, Kfar Varburg (IL)

(73) Assignee: Ben Gurion University of the Negev Research and Development Authority, Beer Sheva (IL)

( * ) Notice: Subject to any disclaimer, the term of this patent is extended or adjusted under 35 U.S.C. 154(b) by 438 days.

(21) Appl. No.: 10/587,113

(22) PCT Filed: Dec. 13, 2004

(86) PCT No.: PCT/IL2004/001124

§ 371 (c)(1), (2), (4) Date: Jun. 25, 2008

(87) PCT Pub. No.: WO2005/073305

PCT Pub. Date: Aug. 11, 2005

(65) Prior Publication Data

US 2008/0255294 A1    Oct. 16, 2008

(30) Foreign Application Priority Data

Jan. 29, 2004  (IL) ..................... 160145

(51) Int. Cl.
C08K 3/04 (2006.01)
C08L 53/00 (2006.01)
(52) U.S. Cl. ............... 524/495; 524/496; 524/505; 428/403; 423/447.1; 423/461
(58) Field of Classification Search ............... 524/495, 524/505; 428/403; 423/447.1, 461
See application file for complete search history.

(56) References Cited

U.S. PATENT DOCUMENTS 6,878,361 B2 * 4/2005 Clarke et al. ............... 423/461
6,890,654 B2 * 5/2005 Stupp et al. ............... 428/403
7,074,310 B2 * 7/2006 Smalley et al. ............ 204/450
2003/0151030 A1  8/2003 Gurin
2003/0207984 A1  11/2003 Ding et al.

FOREIGN PATENT DOCUMENTS

WO    WO 02/076888    10/2002

OTHER PUBLICATIONS

Schvartzman-Cohen et al, "Generic Approach for . . . Interaction", Langmuir 2004, 20, pp. 6085-6088.
Kang et al, "Micelle-Encapsulated Carbon . . . Composites", J. Am. Chem. Soc. 2003, 125, pp. 5650-5651.
Baughman R. H. et al.: Science 297 (2002) 787.
Girifalco L.A. et al.: Physical Review B (PRB) 62, 19 (2000) 13104.
Chen J. et al: Science 282 (1998) 95.
Boul P. et al.: Chem Phys. Lett. 310 (1999) 367.
Vigolo B. et al.: Science 290 (2000) 1331.
Wang J. et al.: J. Am. Chem. Soc. 125 (2003) 2408.
Moore V.C. et. al.: NanoLetters 3, (2003) 1379.
Chen J. et al.: Am. Chem. Soc. 124 (2002) 9034.
O'Connel M.J. et al.: Science 297 (2002)593.
Garg A. and Sinnott S.B.: Chem.Phys. Lett. 295 (1998) 273.
Bandyopadhyaya R. et al.: Nano Letters, 2(1) (2002) 25.

* cited by examiner

*Primary Examiner*—Vickey Nerangis
(74) *Attorney, Agent, or Firm*—Roach Brown McCarthy & Gruber, P.C.; Kevin D. McCarthy

(57) ABSTRACT

The invention provides a method for the preparation of a suspension of de-agglomerated carbon nanotubes, comprising mixing agglomerated carbon nanotubes with a block copolymer. Further, a powder of de-agglomerated carbon nanotubes is provided, that can be easily redispersed to obtain a suspension of untangled carbon nanotubes. The invention also relates to the use of the provided materials in the preparation of composites, and in electronics.

14 Claims, 4 Drawing Sheets

METHOD FOR THE PREPARATION OF DISPERSIONS OF CARBON NANOTUBES

FIELD OF THE INVENTION

The present invention relates to exfoliating and dispersing carbon nanotubes, and provides a method for the preparation of a stable suspension of carbon nanotubes in fluid media using block copolymers. The invention also provides a powder of carbon nanotubes that can be re-dispersed in a fluid medium to form a stable suspension.

BACKGROUND OF THE INVENTION

Carbon nanotubes, multiwalled carbon nanotubes (MWNT) as well as single walled carbon nanotubes (SWNT), are currently attracting scientific and technological attention due to their fascinating properties and emerging applications [Baughman R. H. et al.: Science 297 (2002) 787]. As-prepared SWNT tend to assemble into bundles or ropes arranged in a close packed lattice or network. Inter-tube interactions within the bundles are dominated by van der Waals interactions of high cohesive energy rendering them inseparable [Girifalco L. A. et al.: Physical Review B (PRB) 62, 19 (2000) 13104]. Multilevel aggregation of the tubes results in low solubility and low dispersability of carbon nanotubes (CNT), affects their mechanical and electronic properties, and acts as an obstacle for most applications. For example, utilization of CNT as conducting fillers in polymeric matrices might benefit from their high length-to-diameter ratio (aspect ratio), which theoretically enables low percolation threshold (lowest CNT concentration still providing a conductive material); however, observed percolation thresholds are usually higher than expected due to aggregation of tubes.

Several methods, designed to reduce the short-range attraction between adjacent tubes, have been tried for dispersing and exfoliating the bundles of CNT. Some of the methods were shown to lead to exfoliation of bundles of SWNT in addition to dispersion of ropes. The methods include chemical modifications [Chen J. et al: Science 282 (1998) 95; Boul P. et al.: Chem Phys. Lett. 310 (1999) 367], surfactant adsorption [Vigolo B. et al.: Science 290 (2000) 1331; Wang J. et al.: J. Am. Chem. Soc. 125 (2003) 2408; Moore V. C. et. al.: NanoLetters 3, (2003) 1379], preparation of CNT/polymer composites, and adsorption of homopolymers onto CNT [Star A. et al.: Angew. Chem. Int. 40 (Ed. 2001) 1721; Chen J. et al.: Am. Chem. Soc. 124 (2002) 9034; O'Connel M. J. et al.: Science 297 (2002) 593]. The said methods comprise several disadvantages. It was, for example, shown that covalent modification often leads to impairing of mechanical and electrical properties of CNT [Garg A. and Sinnott S. B.: Chem. Phys. Lett. 295 (1998) 273], and to a change in the electronic structure [Chen J. et. al.: Science 282 (1998) 95]. In addition, methods that rely on surfactants are restricted to low concentrations of CNT [Vigolo B. et al.: Science 290 (2000) 1331]. Thus, surfactant-CNT suspensions usually contain a low concentration of individual tubes, along with a low concentration of ropes and bundles of CNT [Bandyopadhyaya R. et al.: Nano Letters, 2(1) (2002) 25]. It is therefore an object of this invention to provide a method for exfoliation of carbon nanotubes, that enables a sufficient concentration of suspended, de-agglomerated CNT, leading to the formation of stable dispersions, while preserving their unique properties. WO 02/076888 describes a method for the preparation of a suspension of CNT, comprising water-soluble polymers, providing stable dispersions of carbon nanotubes of high concentrations, said stable dispersion being an aqueous suspension.

It is therefore a further object of this invention to provide a method for the preparation of stable, concentrated suspension of carbon nanotubes comprising a polymer, in general environment, such as aqueous media or organic solvents.

It is still another object of this invention to provide a method for exfoliating and dispersing carbon nanotubes and store them in a ready-to-use powder form.

It is a further object of this invention to provide a method for dispersing carbon nanotubes, comprising a polymer that can act as a compatibilizer for suitable contact between said tubes and their microenvironment.

Other objects and advantages of present invention will appear as description proceeds.

SUMMARY OF THE INVENTION

The present invention relates to the exfoliation and dispersal of the carbon nanotubes, and to a method for the preparation of a suspension of carbon nanotubes, comprising i) adding to a fluid medium a material comprising carbon nanotubes; ii) adding to said fluid medium, prior to the addition of carbon nanotubes or thereafter, a block copolymer; and iii) stirring said fluid medium; thereby to bring about de-agglomeration of the nanotubes into dispersed small bundles of nanotubes or essentially single tubes. Said stirring preferably comprises sonicating the nanotubes in the fluid medium. Said block copolymer comprises in its sequence at least two blocks that differ either in the chemical structure of their monomer units or in the sequence of said units within the block. In a preferred embodiment of a method according to this invention, said block copolymer comprises two or three blocks that differ in the chemical structure of their monomer units, an example being a block copolymer having a structure A-B, A-B-A or A-B-C, or random-block copolymers. Blocks in polymers used in this invention have preferably more than ten monomer units each. Fluid medium is any fluid in which said block copolymer can be perfectly homogenized, such as a fluid capable to dissolve said polymer, such as an aqueous solution, organic solvent, or a supercritical fluid. Said block copolymer should be soluble in said fluid medium, and said medium should preferably be selective in its solubilizing power toward different blocks of said copolymer; said medium should selectively dissolve two (or more) different homopolymers that have the same chemical composition as said different blocks forming said block copolymer. In some embodiments of a dispersion according to this invention, said blocks A, B and C may comprise a polymer selected from polyoxyalkylenes such as ethylene oxide or propylene oxide, polystyrene, polyacrylate, polysiloxane, their derivatives, and any other polymers meeting the above mentioned conditions. Solvents are selected so as to meet the above conditions, and examples may include water, alcohols, alkanes, etc.

This invention also provides a powder of substantially de-agglomerated carbon nanotubes, which is a ready-to-use form easily re-dispersible in water or organic solvent, according to intended application. The invention is directed to the preparation of said ready-to-use powder, comprising i) preparing a suspension of substantially untangled carbon nanotubes in a fluid medium comprising a block copolymer, and ii) removing the fluid medium from said suspension, utilizing known methods, such as filtration, centrifugation, evaporation, lyophylization, etc.

The sum of concentrations of carbon nanotubes and polymer in the suspension may be up to 50-60 wt %, being related to the solubility of the polymer, and the ratio of said concentrations is from 0.05 to 20, preferably from 0.1 to 10.

This invention is directed to a powder of carbon nanotubes, comprising a block copolymer in admixture therewith, wherein said carbon nanotubes in said powder are substantially de-agglomerated, as indicated by physical methods, such as X-ray diffraction. This invention also relates to the use of dispersions and powders, comprising carbon nanotubes and block copolymers, for depositing carbon nanotubes onto a solid support in a required pattern, for preparing a conductive plastic material, for reinforcing polymeric matrices, as an electric conductive connectors between two electronic devices, preferably when one or both of the devices are nanoelectronic devices, in techniques comprising the formation of a thin layer, techniques comprising the formation of thin wires, and in printing and coating techniques.

BRIEF DESCRIPTION OF THE DRAWINGS

The above and other characteristics and advantages of the invention will be better understood through the following illustrative examples, and with reference to the appended drawings, wherein.

DETAILED DESCRIPTION OF THE INVENTION

Figure 1:
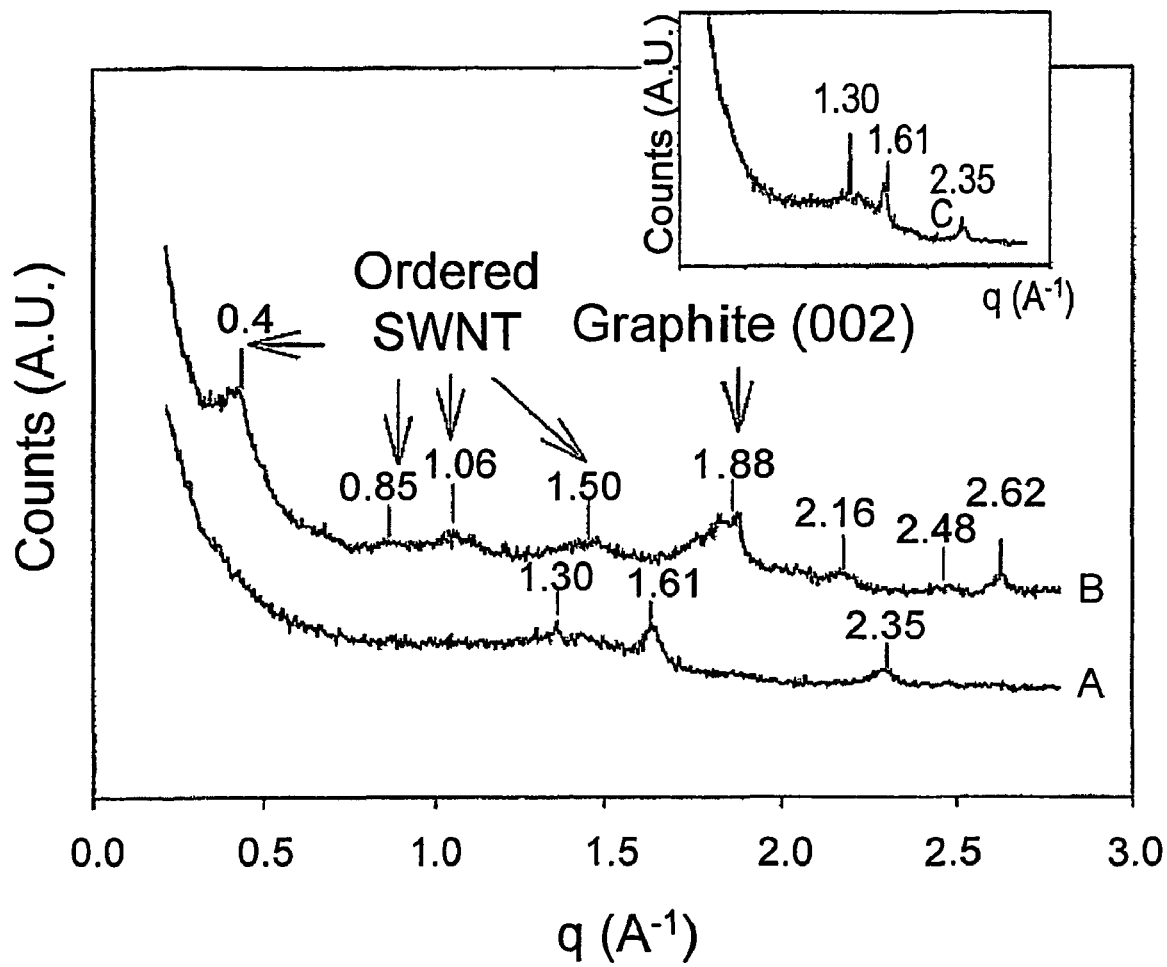
FIG. 1. Shows wide angle X-ray spectra (WAXS) of (A) as-produced carbon nanotubes, and of (B) 1% dried powder comprising poly(styrene)-poly(t-butyl acrylate) and 1% SWNT Select EtOH, prepared according to the invention; wherein the inset shows the WAXS pattern of the polymer itself.

It was found by us that some di-block (A-B) and tri-block (A-B-A) copolymers have a surprising effect on CNT in both aqueous and organic media, leading to the formation of stable dispersions of individual tubes or small bundles of tubes.

It was found by us that solutions of a di-block or tri-block copolymer in a solvent selective to one of the blocks disperse CNT, whereas solutions of a di-block or tri-block copolymer in a solvent solubilizing well both block types does not necessarily disperse CNT; and moreover, it was found by us that homopolymers of the composition identical to one of said blocks do not necessarily disperse CNT either.

A method for dispersing CNT, and for the preparation of a stable suspension of CNT, according to this invention comprises mixing in any order, and stirring, preferably by the sonication, a fluid medium, and a block copolymer. Said fluid medium may comprise an aqueous solution, organic solvent, or supercritical fluid; said CNT may comprise SWNT or MWNT. Said copolymer may comprise a di-block copolymer of A-B type, a tri-block copolymer of A-B-A type, a tri-block copolymer of A-B-C type, or a random copolymer comprising at least two block types. Each block is an essentially homogeneous sequence of monomers or low oligomers, wherein the number of monomers in said sequence is preferably higher than 10.

In a preferred embodiment of this invention, a di-block or tri-block copolymer is dissolved in a selective solvent, and a powder of as-produced nanotubes, containing a bundled network of ropes is added to it and sonicated at mild conditions, resulting in a black, homogeneous, ink-like suspension which is stable for weeks, typically for more than 1000 hours. In a preferred embodiment, the concentration of said copolymer in said suspension is from 0.05 to 15 wt %, and the concentration of CNT in said suspension is from 0.05 to 10 wt %. Said selective solvent is a fluid medium that dissolves selectively at least two different homopolymers, each having the same chemical composition as one of said different blocks forming said block copolymer.

It was further found by us that the above described suspension of CNT can be dried, and the powder which is obtained can be easily re-dispersed in a pure solvent or solution to a required concentration of polymer-CNT-complex, wherein stirring, preferably sonicating, may be used for said re-dispersal. The resulting suspension is stable for weeks. Said drying, and the removal of fluids from the suspension of carbon nanotubes, may comprise evaporation, lyophilization, centrifugation, and filtration. Reintroduction of the powder into a solvent enables to obtain very high concentrations of CNT. In a preferred embodiment of this invention, the sum of concentrations of said carbon nanotubes and said copolymer in the suspension is up to 60 wt %. This invention is thus directed to a method for the preparation of stable suspensions of CNT, as well as to a method for the preparation of a ready-to-use powder of CNT.

The CNT prepared according to this invention were characterized by electron microscopy, in case of suspensions, and by wide angle X-ray, in case of powders. Both methods confirmed de-agglomeration, and disappearance of the intertube packing, as well as the presence of individual SWNT and MWNT, and small clusters of 2-4 tubes as a result of CNT-polymer interaction. Without committing ourselves to any particular theory, based on our finding that di-block and tri-block copolymers of different molecular weight and chemical nature can be used to create long-lived dispersions of CNT in water and organic solvents, we believe that a small steric repulsion at a distance larger than the equilibrium distance between carbon nanotubes in a bundle or a rope, such as a distance between the polymer-decorated tubes, results in the formation of a small energy barrier that prevents the aggregation and coagulation of individual tubes and small bundles of 2-3 SWNT in aqueous and organic media. The origin of the repulsion is entropic and originates from excluded volume forces acting between adsorbed polymers. The range of such interactions depends on the molecular weight of polymer [For example: Klein J. and Luckham P.: Nature 300 (1982) 429]. As block-copolymers can be tailored at a variety of compositions and chain-lengths they may serve as dispersive agents. Of course, as a skilled person will appreciate, such tailored block-copolymer will also serve as a compatibilizing agent contributing to good adhesion at the tube-matrix interface, thereby improving significantly the properties of CNT-based composite materials.

Electron microscopy shows clearly that suitable block copolymers untangle the bundles of tubes, resulting in small bundles, such as two or three tubes, or substantially free single nanotubes.

A method for the preparation of dispersions or powders of CNT according to this invention may utilize polymers and solvents comprising, but not being limited to, poly(ethylene oxide)-poly(propylene oxide)-poly(ethylene oxide) tri-block copolymers in water, poly(ethylene oxide)-poly(propylene oxide) di-block copolymers in water, poly(styrene)-poly(t-butyl acrylate) di-block copolymers in ethanol or in isopropanol, and poly(ethylene oxide)-poly(dimethyl siloxane)-poly(ethylene oxide) tri-block copolymers in heptane.

A possibility to prepare suspensions or powders of separated carbon nanotubes with defined properties, and controlled concentrations, enables to introduce the carbon nanotubes easily to any system, in any form and quantity, using known techniques for manipulating, portioning, and delivering liquids and powders. This has direct applications in printing, coatings, thin layers, and molecular machines.

Since the polymer adsorbed on the carbon tubes acts as a compatibilizer, marked improvements can be achieved in the quality of the interface between nanotubes and the matrix. The long chain polymers, may serve as adhesion promoters leading to the formation of highly adhesive interfaces between the tubes and a polymeric matrix. Thus, in one aspect, the invention also relates to the provision of a highly adhesive interface between carbon tubes and the polymeric matrix.

It is well known in material science that composite materials, comprising particles of one component homogeneously dispersed in a continuous phase, wherein the particle dimensions are in the order of nanometers, exhibit special mechanical properties. The main obstacle in producing these nanocomposite materials is to overcome strong adhesive forces between the particles. The polymer coated carbon nanotubes according to the invention can be directly used in the production of nanocomposites, because of their excellent dispersion properties. Therefore, the invention further relates to the use of carbon nanotubes in the production of new composite materials, as well as to an article comprising a polymeric material which contains carbon nanotubes together with a block copolymer. In one preferred embodiment, carbon nanotubes serve as a reinforcing agent in a polymer matrix.

Conductive plastic materials based on a non-conductive matrix and a conductive filler have important applications; however their preparation depends on the availability of easily dispersable conductive filler with a sufficient low percolation threshold, which is often the bottleneck. Lowering the filler concentration lowers the costs, and improves the structural properties of the polymeric matrix, such as melt viscosity, transparency, color, etc. By using the dispersion process of this invention, comprising block copolymers of different composition and block length, the nanotubes can be dispersed in different polymeric matrices, at wide range of concentrations. Thus, CNT-based composites may replace current materials that rely on carbon black and other fillers used at concentrations 100 and 1000 times higher than those predicted for CNT fillers. This invention is thus directed also to the use of a dispersion comprising CNT and block copolymers in the production of conductive plastic materials.

The single-wall carbon nanotubes, as is known from the prior art, exhibit superb electrical properties. This invention enables exfoliating and dispersing carbon tubes, and preparing them in the form of ready-to-use powders and dispersions, in suitable concentrations, with suitable compatibilizing linkers bound to the SWNT; and therefore, this invention relates to the use of carbon nanotubes in microelectronics. This invention enables an easy deposition of nanotubes in the form of powder particles or suspension droplets at a relevant location in an electronic array, where the tubes can serve, for example as nanocontacts. The suspensions or powders of this invention may be used for creating an electric conductive connectors between two electronic devices, wherein one of the devices, or both of them, are nanoelectronic devices. The suspensions or powders of this invention may be used for creating fibers by drawing from solution or using other methods for fiber preparation.

The present invention is directed to the use of the carbon nanotubes in suspension or in powder in all applications where essentially single carbon tubes or small bundles are required. The invention also relates to the use of a suspension or a powder of carbon nanotubes for depositing carbon nanotubes onto a solid support in a required pattern, or as a template, or for the formation of a thin layer or a thin wire. In a preferred embodiment of a use according to this invention, a powder or a suspension of carbon nanotubes is used is printing or coating.

EXAMPLES

Materials

Poly(ethylene oxide)-b-(propylene oxide) block copolymer were obtained from BASF AG (Germany). The characteristics are given in the table

| Polymer | Mw (g/mol) | PPO (g/mol) | PEO wt % |
|---------|-----------|-------------|----------|
| PE6200  | 2450      | 1750        | 20       |
| PE6400  | 2900      | 1750        | 40       |
| PE6800  | 8000      | 1750        | 80       |
| PE10500 | 6500      | 3250        | 50       |

Poly(styrene)-b-(t-polybutyl acrylate) (PS-PBA) were obtained from Polymer Source, Canada. Poly(ethylene oxide)-poly(dimethyl siloxane)-poly(ethylene oxide) [PEO-PDMS-PEO] was synthesized according to Zhang & Gottlieb [Zhang Z. R. & Gottlieb M.: Thermochimica Acta 336 (1999) 133-45].

Select Grade (SWNT1) and AP grade (SWNT2) of Single Walled Carbon Nanotubes were purchased from Carbolex, University of Kentucky, Lexington, Ky., USA. These nanotubes had been synthesized by arc-discharge, and according to the specifications by the manufacturer, the as-prepared Select Grade consists of 85 vol % pure SWNT, while the AP grade consists of 50-70 vol % SWNT. The samples contain graphite, carbon impurities, and catalyst (cobalt and nickel). The average diameter of the tubes is 1.3 nm, and their typical length is in the range of hundreds of nanometers.

Multi-walled carbon nanotubes (MWNT) were purchased from Nanocs Inc. Their average diameter is 30 nm, typical length from hundreds of nanometers to microns, the samples containing metal catalyst and amorphous carbon.

Hipco SWNT3 were obtained from Carbon Nanotechnology Inc.

Preparing Suspensions

Polymer solutions were prepared by dissolving a block-copolymer in the desired concentration (ranging from 0.3 wt % to 10 wt %) in a solvent. Nanotubes were dispersed in said solutions, and the mixture was sonicated at mild conditions (50 W, 43 kHz) for 15-30 minutes, and then centrifuged at 3600 rpm for 30 minutes. The ink-like appearance, that remained even after the centrifugation, indicated the dispersal of CNT within the medium. The stability of suspensions was further checked by storing them at room temperature and examining them both visually and by electron microscope.

X-Ray Scattering Measurements

The aggregation state of dried powders was examined via X-ray scattering experiments, using Philips X-ray powder diffractometer (PW-1050/70), employed at 40 kV/28 mA with Cu Kα (radiation wavelength λ=0.154 nm) radiation and graphite monochromator, the scattering vector being $q=4\pi/\lambda \sin \theta$, $\theta$ being the scattering angle.

Microscopy

Figure 3:
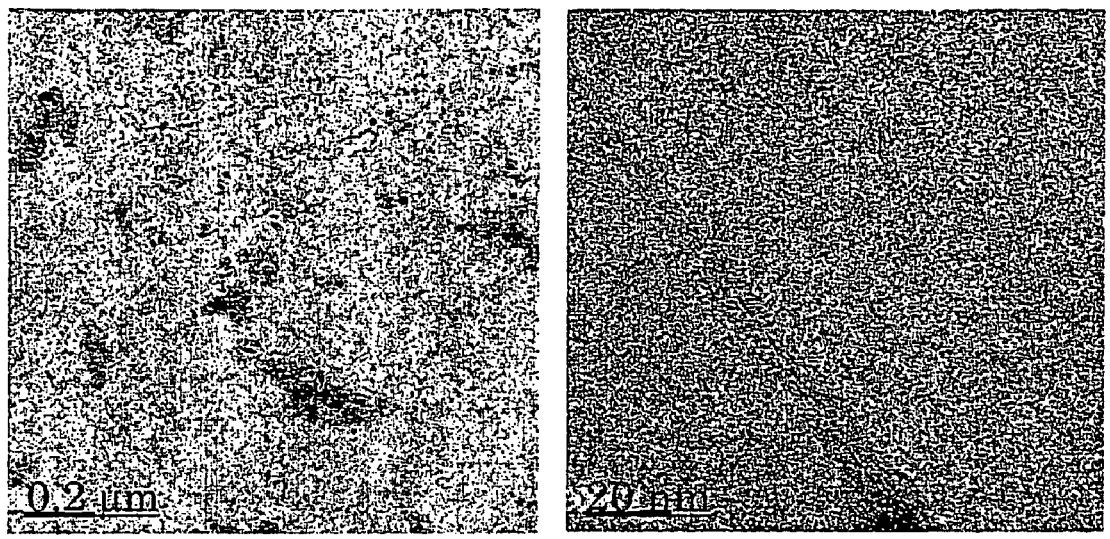
FIG. 3. Presents two TEM images of SWNT dispersions in PE10500. The images were taken for the dispersion used for preparation of the dry powder that was measured by WAXS (FIG. 2). The composition of the dispersions is: PE10500 2.5%+SWNT 1% in water. Cryo-TEM image of the dispersion which is known to preserve the structures present in the solution is in (A) and high resolution TEM present the finer details of the individual tubes (B)

The microscopic structure of the dispersions was examined using high Resolution TEM (JEOL 2010, Gatan 794 ccd camera operated at 200 kV, scale bar in micrographs representing 10 nm. The micrographs could reveal separation of the tubes. Cryo-TEM FIG. 3(A)] was performed at −170° C. using JEOL 1200EXII TEM equipped with a Gatan 626 cold stage, scale bar in micrographs representing 100-200 nm. The micrographs could reveal the overall dispersion of the nanotubes into individual tubes and small bundles of less than 5 tubes within the medium.

Example 1

PS-PBA was dissolved in ethanol or isopropanol to a final concentration of 1, 5 or 10 wt %. SWNT1 or SWNT2 in the amount 5 mg/ml were dispersed as described above, resulting in ink-like dispersions. All dispersions were stable as indicated by the absence of a precipitate, and as checked by electron microscopy. Electron Microscopy (high resolution TEM, HRTEM) indicated that the dispersions were composed mainly of individual tubes and small bundles (2-3 tubes), the dispersion being stable for more than 8 weeks.

Example 2

The dispersion, as described in Example 1, containing 1 wt % of SWNT1 and 2.5 wt % PS-PBA in ethanol, was dried at room temperature for 48 hours. The aggregation state of the powder was examined via X-ray scattering. Also examined was the powder of SWNT1, and a powder obtained by drying of 1 wt % PS-PBA in ethanol. A typical wide angle X-ray scattering pattern (WAXS) of as-produced powder SWNT1 is presented in FIG. 1A exhibiting a typical rope structure: the peaks at the low-q region indicate a two-dimensional triangular lattice with a lattice constant of 18 A. In addition, graphitic peaks can be seen (at $q=1.88 Å^{-1}$) in good agreement with previous observations. The inset, FIG. 1C, shows the WAXS pattern of the polymer. In FIG. 1A a WAXS spectrum is seen of the dry powder of SWNT prepared according to the invention as described above. FIG. 1A clearly shows the good separation of the ropes into individual tubes of SWNT in the material of CNT of this invention. are well separated.

Example 3

Figure 5:
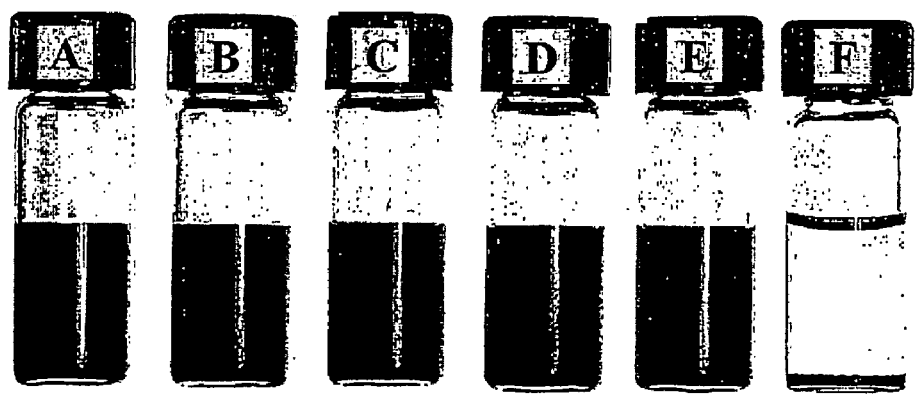
FIG. 5. Shows 6 samples of SWNT dispersions: (A) poly(styrene)-poly(t-butyl acrylate) in EtOH, (B) in isopropanol, (C) Poly(ethyleneoxide-b-PDMS-b-ethyleneoxide) in heptane, (D) PE6800 in water, (E) PE10500 in water, (F) poly(styrene)-poly(t-butyl acrylate) in Toluene.

PEO-PDMS-PEO was dissolved in heptane to final concentrations of 1 or 5 wt %. Carbon tubes SWNT2 and MWNT, 5 and 10 mg/ml, were sonicated in the solutions (following the procedure described above), resulting in the formation of ink-like dispersions (FIG. 5). The dispersions were stable for many weeks. The dispersions, 1 ml, were dried at room temperature for 48 hours, and about 0.01 to 0.05 g, depending on the initial concentration, of a black powder was obtained, which was re-dispersed in 10 μL heptane by sonicating for 2-3 minutes. Electron microscopy imaging indicated that the obtained dispersion was composed of de-agglomerated SWNT, with a distribution of individual tubes and bundles of 2-3 tubes similar to that of the original dispersion.

Example 4

Dispersions of MWNT, 3 wt %, were prepared in three solvent/polymer systems, as shown in the following table, including PS-PBA, and PEO-PDMS-PEO]. The results are in the table.

TABLE 4

The stability of CNT

| Polymer type | Polymer conc. | Solvent | Dispersion |
|---|---|---|---|
| PS-PBA | 3.5 wt % | Ethanol | Stable |
| PS-PBA | 3.5 wt % | Isopropanol | Stable |
| PEO-PDMS-PEO | 5 wt % | heptane | Stable |

The dispersions were stable for more than 4 months.

Example 5

PEO-PDMS-PEO tri-block copolymer, was dissolved in toluene which is a good solvent for both blocks. SWNT2 were sonicated in a suspension as described above, but no dispersion of CNT was observed (FIG. 6F).

Further it was found by us that PDMS, itself soluble in heptane, did not disperse the CNT in heptane.

Example 6

Homopolymers of PEO (purchased from Polymer Laboratories, UK) are characterized in the following table:

| Polymer | $M_w$ (g mol$^{-1}$) | $M_w/M_n$ | N |
|---|---|---|---|
| PEO9k | 9,202 | 1.07 | 209 |
| PEO78k | 77,592 | 1.06 | 1763 |

Neither water nor toluene solution of the above polymers succeeded to form a dispersion of SWNT2 or MWNT.

Example 7

Figure 2:
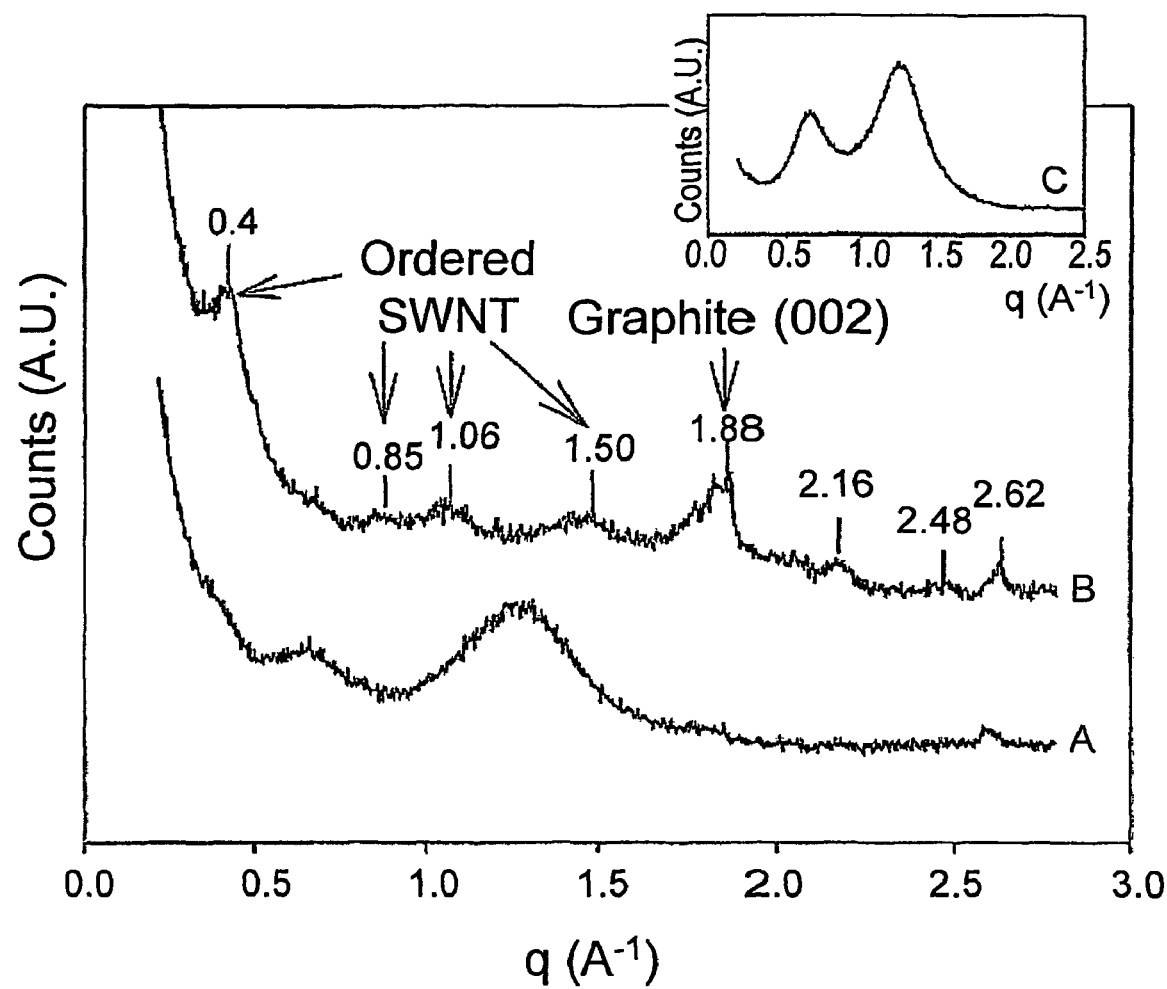
FIG. 2. Shows wide angle X-ray spectra (WAXS) of (A) as-produced carbon nanotubes, and of (B) 2.5% dried powder comprising PE10500 2.5%+SWNT Select 1% in water, prepared according to the invention; wherein the inset shows the WAXS pattern of the polymer itself.

A dispersion containing 2.5 wt % PE10500 (Table in the paragraph Material), and 1% SWNT1 in water was dried at room temperature for 48 hours, and the aggregation state of the powder was examined via X-ray scattering. FIG. 2, indicates clearly, similarly as in Example 2, that the bundles are separated into single tubes.

Example 8

Dispersions 0.3% SWNT2 in water and 1, 5, 10 wt % of the di-blocks were prepared as described above. Stable, black dispersions were obtained. The dispersions were checked by TEM and cryo-TEM 12 weeks after its preparation. Similar images to those described in FIG. 3 were obtained.

Example 9

Figure 4:
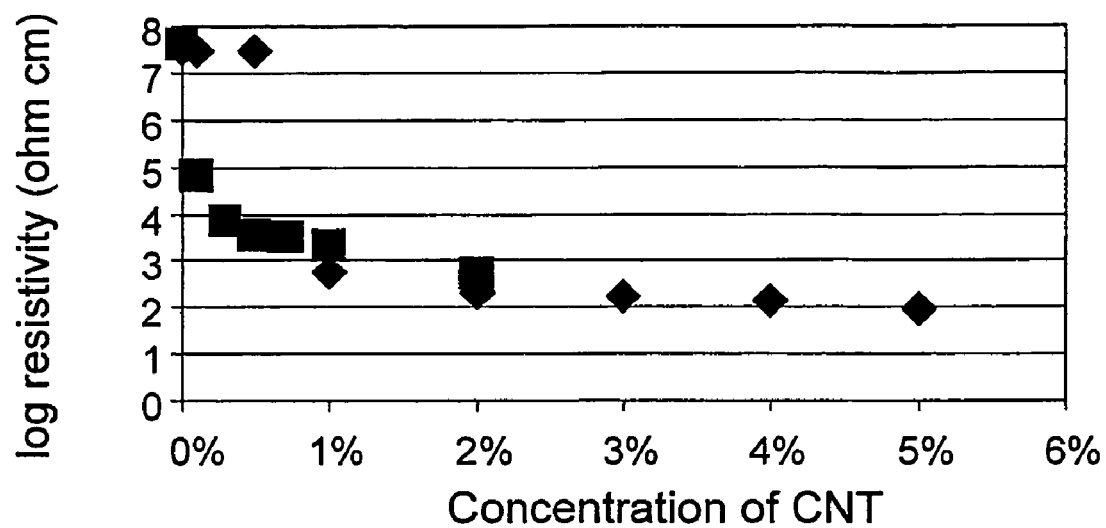
FIG. 4. Shows resistivity of CNT-polymer composites according to this invention, squares being SWNT and diamonds MWNT.

A dispersion of Hipco nanotubes was prepared by sonicating 10 mg of said tubes in 10 ml of 5% solution of PS-PBA in ethanol; 4 ml were mixed with 2 ml of 10 wt % aqueous solution of "Acronal 290D" (manufactured by BASF being N-butyl-acrylate-styrene copolymer, with many additives). The resulting dispersion was dried at ambient conditions leading to the formation of a black thin film of which resistivity was measured in duplicates, using 2-point probe set up. FIG. 4 shows the results. It can be seen that the percolation threshold is lower than 0.1% for SWNT (squares), and lower than 0.5% for MWNT (diamonds).

Modifications and variations of the present invention, as described above and illustrated in the examples, are possible. The invention can be applied to the dispersal of carbon nanotubes, that were prepared by various procedures, wherein various suitable copolymers can be used. The nanotubes of this invention may be used as a suspension or as a powder, in various articles of manufacture. Any copolymer providing the desired effect, as specified herein, is suitable in the method of this invention. It is therefore understood that within the scope of the appended claims, the invention may be realized otherwise than as specifically described.

The invention claimed is:

1. A method for the preparation of a suspension of carbon nanotubes at a concentration of from 0.5 wt % to 10 wt %, comprising
    a. adding to a fluid medium a material comprising carbon nanotubes;
    b. dissolving a block copolymer in the desired concentration ranging from 0.3 wt % to 10 wt % in said fluid medium, prior to the addition of carbon nanotubes or thereafter, wherein the mass ratio of said copolymer to carbon nanotubes ranges from 0.1 to 10; and
    c. stirring said fluid medium comprising sonication;
thereby to bring about de-agglomeration of the nanotubes into dispersed small bundles of nanotubes or essentially single tubes, said fluid medium being a solvent selective toward at least two blocks of said block copolymer.

2. A method according to claim 1, wherein said small bundles comprise two and three carbon nanotubes.

3. A method according to claim 1, wherein said fluid medium is selected from the group consisting of water or aqueous solution, organic solvent, supercritical fluid, and their mixture.

4. A method according to claim 1, wherein said block copolymer comprises in its sequence at least two blocks that differ either in the chemical structure of their monomer units or in the sequence of said units within the block.

5. A method according to claim 4, wherein said fluid medium dissolves selectively at least two different homopolymers, each having the same chemical composition as one of said different blocks forming said block copolymer.

6. A method according to claim 1, wherein said block copolymer comprises two or three blocks that differ in the chemical structure of their monomer units.

7. A method according to claim 1, wherein said block copolymer has structure A-B or A-B-A or A-B-C.

8. A method according to claim 1, wherein said block copolymer comprises two or three blocks which have more than ten monomer units each.

9. A method according to claim 1, wherein said block copolymer is soluble in said fluid medium.

10. A method according to claim 1, wherein the sum of concentrations of said carbon nanotubes and said copolymer in the suspension is up to 60 wt %.

11. A method according to claim 1, wherein said block copolymer comprises a polymer selected from the group consisting of polyoxyalkylenes, polystyrene, polyacrylate, polysiloxane, and their derivatives.

12. A method according to claim 1, wherein said fluid medium comprises water, alcohol, or alkane.

13. A method for the preparation of a powder of de-agglomerated carbon nanotubes comprising
    a. preparing a suspension of carbon nanotubes in a fluid medium, comprising adding to said medium carbon nanotubes at a concentration of from 0.5 wt % to 10 wt %, and a block copolymer at the mass ratio of said copolymer to carbon nanotubes ranging from 0.1 to 10, sonicating, and
    b. removing said fluid medium from said suspension.

14. A method according to claim 13, wherein said removing comprises filtration, centrifugation, evaporation, or lyophylization.

* * * * *